US008856740B2

(12) United States Patent
Wilson et al.

(10) Patent No.: US 8,856,740 B2
(45) Date of Patent: Oct. 7, 2014

(54) IMPLEMENTING MULTIPLE VERSIONS OF A PLUG-IN CONCURRENTLY

(75) Inventors: Kevin Lee Wilson, Fort Collins, CO (US); Travis S. Tripp, Fort Collins, CO (US); Petr Balcar, Jicin (CZ); Ales Jerabek, Prague (CZ)

(73) Assignee: Hewlett-Packard Development Company, L.P., Houston, TX (US)

( * ) Notice: Subject to any disclaimer, the term of this patent is extended or adjusted under 35 U.S.C. 154(b) by 101 days.

(21) Appl. No.: 13/563,532

(22) Filed: Jul. 31, 2012

(65) Prior Publication Data

US 2014/0040874 A1 Feb. 6, 2014

(51) Int. Cl.
*G06F 9/44* (2006.01)
*G06F 9/445* (2006.01)

(52) U.S. Cl.
USPC ........... 717/121; 717/103; 717/106; 717/168; 717/177

(58) Field of Classification Search
None
See application file for complete search history.

(56) References Cited

U.S. PATENT DOCUMENTS

| | | | | |
|---|---|---|---|---|
| 5,903,728 | A * | 5/1999 | Semenzato | 709/217 |
| 6,742,176 | B1 * | 5/2004 | Million et al. | 717/120 |
| 6,871,345 | B1 * | 3/2005 | Crow et al. | 717/175 |
| 7,254,814 | B1 * | 8/2007 | Cormier et al. | 718/106 |
| 7,519,976 | B2 * | 4/2009 | Blevins | 719/328 |
| 7,596,611 | B1 * | 9/2009 | Satish et al. | 709/223 |
| 7,640,332 | B2 * | 12/2009 | Dahiya | 709/223 |
| 7,644,161 | B1 * | 1/2010 | Graupner et al. | 709/226 |
| 7,650,397 | B2 * | 1/2010 | Price et al. | 709/221 |
| 7,818,758 | B2 * | 10/2010 | de Bonet et al. | 719/328 |
| 7,917,855 | B1 * | 3/2011 | Satish et al. | 715/744 |
| 8,046,779 | B2 * | 10/2011 | Wusthoff et al. | 719/328 |
| 8,195,824 | B2 * | 6/2012 | Park et al. | 709/230 |
| 8,225,296 | B2 * | 7/2012 | McDowall | 717/141 |
| 8,234,660 | B2 * | 7/2012 | Ari et al. | 719/320 |
| 2003/0110312 | A1 * | 6/2003 | Gunduc et al. | 709/328 |
| 2003/0200061 | A1 * | 10/2003 | Yamanaka et al. | 702/188 |
| 2005/0060698 | A1 * | 3/2005 | Boykin et al. | 717/166 |
| 2005/0157321 | A1 * | 7/2005 | Alacar | 358/1.13 |
| 2007/0088707 | A1 * | 4/2007 | Durgin et al. | 707/10 |
| 2007/0156913 | A1 * | 7/2007 | Miyamoto et al. | 709/230 |
| 2007/0240134 | A1 * | 10/2007 | Buragohain et al. | 717/140 |
| 2008/0022292 | A1 * | 1/2008 | Gibson | 719/328 |
| 2008/0229288 | A1 * | 9/2008 | Nelson et al. | 717/127 |
| 2008/0235710 | A1 * | 9/2008 | Challenger et al. | 719/316 |
| 2008/0295074 | A1 * | 11/2008 | Schneider et al. | 717/120 |
| 2009/0113392 | A1 * | 4/2009 | Wijenayake et al. | 717/124 |
| 2009/0288098 | A1 * | 11/2009 | Abd-El-Malek et al. | 719/312 |
| 2010/0251034 | A1 * | 9/2010 | Zhang et al. | 714/48 |

(Continued)

OTHER PUBLICATIONS

A.Kishore/Sachin,"Running Multiple Versions of JRE Plug in," Oracle Certified Professional, pp. 1-2, available at http://www.appsdba.info/docs/oracle_apps/R12/Running_Multiple_Versions_JRE_Plug%20in.pdf (last accessed on Aug. 2, 2012).

(Continued)

*Primary Examiner* — Isaac T Tecklu

(57) ABSTRACT

A system and method for implementing multiple versions of a plug-in concurrently are provided herein. The method includes identifying a plug-in within a multi-plug-in platform that is configured to provide a desired functionality. The method also includes executing a first version and a second version of the plug-in concurrently to provide the desired functionality, wherein each version of the plug-in is isolated from the other version of the plug-in.

19 Claims, 4 Drawing Sheets

(56) References Cited

U.S. PATENT DOCUMENTS

| | | | | |
|---|---|---|---|---|
| 2010/0293491 | A1* | 11/2010 | Kawai | 715/771 |
| 2010/0318984 | A1* | 12/2010 | Araki | 717/174 |
| 2011/0047536 | A1* | 2/2011 | Santos et al. | 717/170 |
| 2011/0099283 | A1* | 4/2011 | Park et al. | 709/230 |
| 2011/0126192 | A1* | 5/2011 | Frost et al. | 717/178 |
| 2011/0197175 | A1* | 8/2011 | Bouz et al. | 717/107 |
| 2011/0219311 | A1* | 9/2011 | Diament et al. | 715/736 |
| 2012/0047568 | A1* | 2/2012 | Keng | 726/9 |
| 2012/0079383 | A1* | 3/2012 | Thanumalayan et al. | 715/716 |
| 2012/0159145 | A1* | 6/2012 | Cheong et al. | 713/100 |
| 2012/0204142 | A1* | 8/2012 | Rubenstein et al. | 717/101 |
| 2012/0222006 | A1* | 8/2012 | Wijenayke et al. | 717/120 |
| 2013/0190080 | A1* | 7/2013 | Bibbey et al. | 463/29 |
| 2013/0263088 | A1* | 10/2013 | Hoff et al. | 717/121 |

OTHER PUBLICATIONS

Karl Heinz Marbais, "Maven Assembly Plugin . . . Multiple Artifacts with Different Configurations," 2009, Available at http://maven.40175.n5.nabble.com/Maven-Assembly-Plugln-Multiple-Artifacts-with-different-configurations-td125286.html, (last accessed on Aug. 2, 2012) 3 pp.

\* cited by examiner

200

300

IMPLEMENTING MULTIPLE VERSIONS OF A PLUG-IN CONCURRENTLY

BACKGROUND

A plug-in is a set of software components that may be used to extend or customize the functionalities of a software application. For example, a plug-in may be used to integrate new content into an existing application. However, application environments typically only allow a single instance of a plug-in to be integrated at a time. In many cases, it may be desirable to replace an existing version of a plug-in with a new version of the plug-in. In such cases, if the application environment only supports one instance of a plug-in at a time, the new version of the plug-in may immediately replace the existing version of the plug-in in the application environment. Thus, the entire application environment may be exposed to the new version of the plug-in without proper testing of the new version of the plug-in.

BRIEF DESCRIPTION OF THE DRAWINGS

Certain examples are described in the following detailed description and in reference to the drawings, in which.

DETAILED DESCRIPTION OF SPECIFIC EXAMPLES

Techniques described herein relate generally to the implementation of multiple instances of a plug-in concurrently. More specifically, techniques described herein relate to a multi-plug-in platform that is configured to execute any of a number of different versions of a plug-in concurrently to provide a desired functionality. This may be accomplished by isolating each version of the plug-in from all other versions of the plug-in.

The techniques described herein may allow for proper testing of a new version of a plug-in prior to implementation of the new version of the plug-in within an entire computing environment. For example, an existing version of a plug-in may be executed in one region of a computing environment, while a new version of the plug-in may be tested in another region of the computing environment. Once it has been verified that the new version of the plug-in provides a desired functionality, the new version of the plug-in may replace the existing version of the plug-in throughout the entire computing environment. Alternatively, the new version of the plug-in may be exposed in a controlled manner by slowly migrating portions of the environment from the existing version of the plug-in to the new version of the plug-in. Thus, the new version of the plug-in may be tested in a controlled manner without posing a significant risk to the computing environment.

Figure 1:
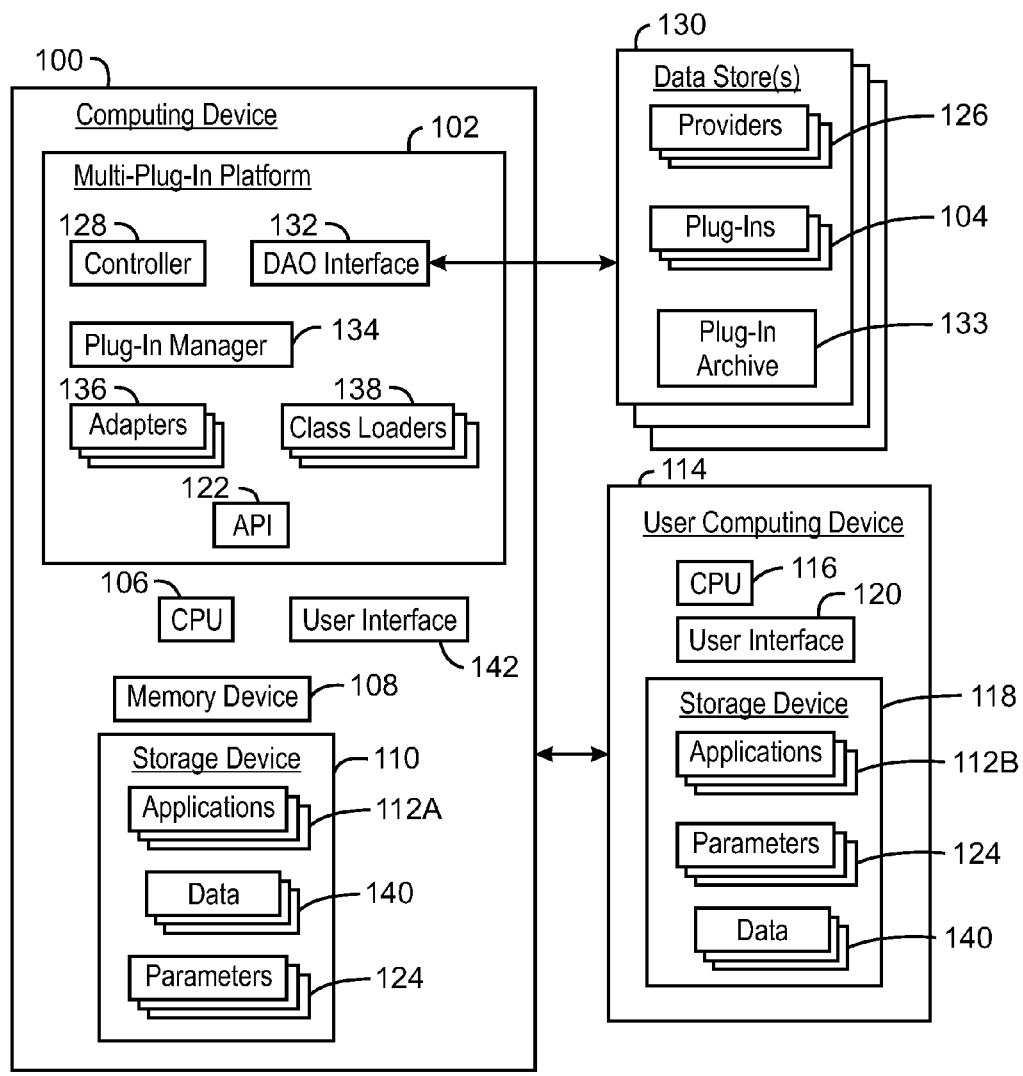
FIG. 1 is a block diagram of a computing device in which a multi-plug-in platform may be implemented.

FIG. 1 is a block diagram of a computing device 100 in which a multi-plug-in platform 102 may be implemented. The computing device 100 may be any type of computing device that is capable of implementing the procedure described herein for executing multiple versions of a plug-in 104 concurrently. For example, the computing device 100 may be a laptop computer, desktop computer, tablet computer, mobile device, server, or the like.

The computing device 100 may include a central processing unit (CPU) 104 that is adapted to execute stored instructions, as well as a memory device 108 that stores instructions that are executable by the CPU 106. The CPU 106 can be a single core processor, a multi-core processor, a computing cluster, or any number of other configurations. The memory device 108 can include random access memory (RAM), read only memory (ROM), flash memory, or any other suitable memory systems. The instructions that are executed by the processor 104 may be used to implement a method that includes identifying a plug-in 104 within the multi-plug-in platform 102 that is configured to provide a desired functionality and executing two or more versions of the plug-in 104 concurrently to provide the desired functionality.

The computing device 100 may also include a storage device 110. The storage device 110 can include a hard drive, an optical drive, a thumbdrive, an array of drives, or the like. The storage device 110 may be configured to store any number of applications 112A. The applications 112A may include any types of modules or programs that are configured to perform one or more specific functions. In addition, according to the techniques described herein, an application 112A may utilize one or more plug-ins 104 provided by the multi-plug-in platform 102 to provide a desired functionality that is not supported by the application 112A itself, as discussed further below.

The computing device 100 may be communicatively coupled to a user computing device 114 through a network (not shown). The user computing device 114 may include a CPU 116, such as the CPU 106 discussed with respect to the computing device 100. The user computing device 114 may also include a storage device 118, such as the storage device 110 discussed with respect to the computing device 100, that is configured to store any number of applications 112B. The applications 112B may include any types of modules or programs that are configured to perform one or more specific functions. In addition, according to the techniques described herein, an application 112B may utilize one or more plug-ins 104 provided by the multi-plug-in platform 102 to provide a desired functionality that is not supported by the application 112B itself, as discussed further below. In some cases, the desired functionality may be specified by a user of the user computing device 114 via a user interface 120. In other cases, the desired functionality may be automatically determined by the application 112B during execution of a specific task. Further, an application 112A may communicate with another application 112B using a plug-in 104 that encapsulates the protocol and libraries for communicating with the specific version of the application 112B and is managed by the multi-plug-in platform 102.

According to techniques described herein, the multi-plug-in platform 102 may allow for the execution of more than one version of a plug-in 104 within the same environment, e.g., within the same application 112 or computing device 100 or 114, concurrently. The multi-plug-in platform 102 may accomplish this by ensuring that each instance of a plug-in 104 is isolated from all other instances of the plug-in 104, as discussed further below.

The multi-plug-in platform 102 may receive a request for a plug-in 104 providing a desired functionality from an application 112. Such a request may include, for example, a request for a plug-in that is configured to perform a specific task or provide the application 112 with specific data. In some cases, the request may also include parameters 124 relating to a specific provider 126 or a specific plug-in 104 that is desired by the application 112, or parameters relating to the functionality that is desired by the application 112. As used herein, the term "provider" refers to a service that provides the configuration for a specific instance of a connection to an application 112.

A controller 128 within the multi-plug-in platform 102 may be configured to determine information relating to a suitable provider 126 for providing the desired functionality, as well as information relating to a suitable plug-in 104 provided by the provider 126. The controller 128 may accomplish this by accessing one or more data stores 130 including information relating to the providers 128 and the plug-ins 104 that are supported by the multi-plug-in platform 102. The one or more data stores 130 may be accessed by the controller 128 via a data access object (DAO) interface 132 based on data access objects (DAOs) identified from the parameters 124 received from the application 112, for example. The DAO interface 132 may provide an abstract interface for mapping the request from the application 112 into DAOs containing references to specific portions of memory within the one or more data stores 130.

The information relating to the provider 126 that may be obtained from the one or more data stores 130 may include an identification number of the provider 126, a name of the provider 126, a type of the provider 126, plug-in reference numbers for plug-ins 104 provided by the provider 126, parameters relating to the provider 126, and the like. In addition, the information relating to the plug-in 104 that may be obtained from the one or more data stores 130 may include an identification number of the plug-in 104, a name of the plug-in 104, different versions of the plug-in 104, a type of the plug-in 104, and the like. The information relating to the plug-in 104 may also include a manifest file of the plug-in and a container of plug-in code, which includes a jar file or other archive format obtained from a plug-in archive 133. In addition, metadata associated with the plug-in may be extracted from the plug-in archive 133.

In some examples, a plug-in manager 134 within the multi-plug-in platform 102 stores the information relating to the plug-ins 104 in a cache (not shown). The plug-in manager 134 may also store all data returned from execution of the plug-ins 104 in the cache for future use. In addition, different computer languages for reading and writing the plug-ins 104 may be supported by the plug-in manager 134.

Once the controller 128 has retrieved the information relating to the provider 126 and the plug-in 104, the multi-plug-in platform 102 may use the information to implement multiple instances of the plug-in 104 concurrently. For example, the plug-in manager 134 may use the information to identify an adapter 136 for each version of the plug-in 104 that is to be implemented by the multi-plug-in platform 102.

Each adapter 136 may then construct a class loader 138 for a corresponding version of the plug-in 104 using information obtained from the plug-in archive 133. The class loader 138 may define the manner in which each version of the plug-in 104 will behave. In addition, the class loader 138 for each version of the plug-in may isolate the version of the plug-in 104 from all other versions of the plug-in 104, thus allowing for the execution of multiple versions of the plugin 104 at the same time.

Once the class loader 138 for each version of the plug-in 104 has been constructed, the multi-plug-in platform 102 may execute two or more instances of the plug-in 104, wherein each instance of the plug-in 104 includes a distinct version of the plug-in that supports a specific configuration. The specific configuration may include specific server parameters, host parameters, user parameters, connection parameters, or the like, supported by the plug-in 104. The multi-plug-in platform 102 may then provide the desired functionality to the application 112 via the API 122, for example.

In some cases, the computing device 100 or 114 hosting the application 112 may store data 140 relating to the execution of the multiple versions of the plug-in 104, as well as data 140 relating to a state of execution of the plug-in 104, within the storage device 110 or 118. This may allow for easy execution of the plug-in 104, or a plug-in 104 providing a similar functionality, in the future. For example, the data 140 may include plug-in metadata extracted from the plug-in archive 133 that identifies the functionalities that are supported by the plug-in 104, as well as possible configurations supported by the plug-in 104. Such metadata may be passed back to the multi-plug-in platform 102 at any point in time, and the multi-plug-in platform 102 may use such data 140 to identify or configure a new plug-in 104 that provides the same functionality as the original plug-in 104. This may be useful for instances in which the original plug-in 104 has been modified or deleted. In addition, the data 140 relating to the state of execution of the plug-in 104 may be used to maintain the state of execution of the original plug-in 104 for an extended period of time, thus allowing the original plug-in 104 or a new plug-in 104 to resume execution beginning from the last saved state.

The multi-plug-in platform 102 may be managed by a user of the computing device 100. The user may be, for example, a software developer or administrator. The computing device 100 may include a user interface 142 through which the user of the computing device 100 may manage the configuration and operation of the multi-plug-in platform 102. For example, the user interface 142 may be a read-write user interface through which the user may manage the plug-in configurations by creating, reading, updating, or deleting configuration information. However, in some cases, the user of the computing device 100 may not have access rights to the multi-plug-in platform 102, and the user interface 142 may be a read-only user interface through which the user can only load, reload, or delete plug-ins 104, without altering the plug-in configuration information that was derived from the plug-in archive 133, for example.

The multi-plug-in platform 102 may be an extensible environment. New adapters 136 and/or new class loaders 138 may be added to the multi-plug-in platform 102 during the release of a new version of a product. In addition, information relating to new plug-ins 104 may be uploaded to or updated within the data store 130 during runtime, and information relating to new providers 126 may be created or edited within the data store 130 at any point in time. Thus, the multi-plug-in platform 102 may be continuously adapted according to the functionalities requested by applications 112.

The block diagram of FIG. 1 is not intended to indicate that the computing device 100 is to include all of the components shown in FIG. 1. Further, the computing device 100 may include any number of additional components not shown in FIG. 1, depending on the details of the specific implementation.

Figure 2:
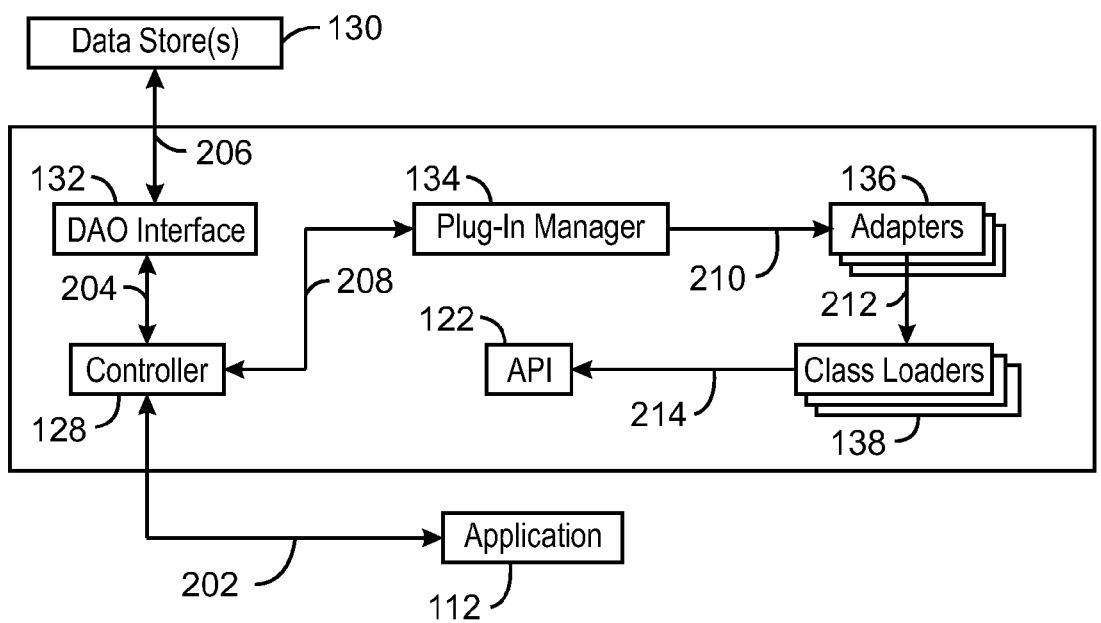
FIG. 2 is a process flow diagram of a process for determining a version of a plug-in to be used to provide a desired functionality for an application.

FIG. 2 is a process flow diagram of a process 200 for determining a version of a plug-in 104 to be used to provide a desired functionality for an application 112. Like numbered items are as described with respect to FIG. 1. The process 200 may be executed by the multi-plug-in platform 102 discussed above with respect to FIG. 1. In addition, according to techniques described herein, the two or more versions of the plug-in 104 may be executed concurrently within the multi-plug-in platform 102 without interfering with one another.

An application 112 may send a request for a plug-in that is configured to provide a desired functionality to the controller 128 within the multi-plug-in platform 102, as indicated by arrow 202. The request may include any accompanying parameters or data relating to the desired functionality. The controller 128 may query any of the one or more data stores 130 to identify the provider 126 and information relating to corresponding plug-ins 104 via the DAO interface 132, as indicated by arrows 204 and 206.

The controller 128 may send a request for an interface implementation, e.g., via the API 122, of the identified plugin configuration to the plug-in manager 134, as indicated by arrow 208. The plug-in manager may identify a suitable plug-in 104 identified by the provider 128 using the DAO interface 132. Once the plug-in 104 has been identified, a suitable adapter 136 may be determined based on an adapter type for the specific version of the plug-in 104 that may be read from the metadata associated with the plug-in 104. The plug-in manager 134 may then delegate the task of configuring the plug-in 104 to the adapter 136, as indicated by arrow 210.

The adapter 136 for the plug-in 104 may construct a corresponding class loader 138 and delegate the resolution of the implementation of the plug-in 104 to the class loader 138, as indicated by arrow 212. The class loader 138 may construct and return an implementation of the API 122, as indicated by arrow 214, and return information relating to the implementation of the API 122 to the controller 128. The controller 128 may execute the configured version of the plug-in 104 using the implementation of the API 122 via calls to the API 122. In addition, the controller 128 may simultaneously execute any number of other versions of the plug-in 104 using the same procedure. For example, multiple versions of the plug-in 104 may be executed to provide the desired functionality for the application 112. In some examples, the desired functionality provided by the multiple versions of the plug-in 104 may be delivered to the application 112 in the form of one or more Java Beans, which include a number of reusable software components or objects. Further, the class loader 138 for each version of the plug-in 104 may isolate the version of the plug-in 104 from all other versions of the plug-in 104 by preventing the public classes and interfaces of the version's embedded libraries from being visible to any other version of the plug-in 104.

It is to be understood that the process flow diagram of FIG. 2 is not intended to indicate that the process 200 is to include all of the steps discussed above in every case, or that each step is to be executed by a particular component in every case. Rather, any number of steps may be added to or deleted from the process 200, depending on the details of the specific implementation. In addition, any number of the components may be replaced with alternative components for performing the steps of the process 200, depending on the details of the specific implementation.

Figure 3:
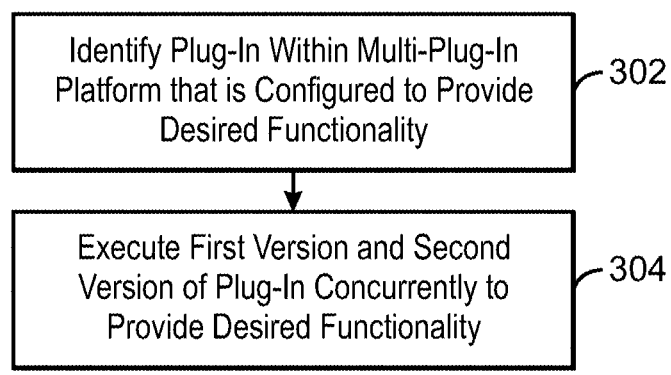
FIG. 3 is a process flow diagram of a method for implementing multiple versions of a plug-in concurrently.

FIG. 3 is a process flow diagram of a method 300 for implementing multiple versions of a plug-in concurrently. The method 300 may be executed by the multi-plug-in environment 102 discussed above with respect to FIGS. 1 and 2. Multiple versions of the same plug-in may be implemented concurrently according to the method 300 in order to allow a software developer or administrator to manage the different versions of the plug-in, as well as the configuration of each version of the plug-in, on-the-fly. For example, the method 300 may allow for the testing of a new version of a plug-in within a particular computing environment without ceasing execution of an existing version of the plug-in within the computing environment. This may allow for the verification of the proper functioning of the new version of the plug-in at a relatively low cost, since the new version of the plug-in may not be implemented within the entire computing environment.

The method begins at block 302, at which a plug-in that is configured to provide a desired functionality is identified within a multi-plug-in platform. The desired functionality may be, for example, any type of functionality requested by an application. More specifically, the desired functionality may be any type of functionality requested by a model element within a computing or networking environment, such as a standard application component, a custom application component, an infrastructure service template, or a custom workflow from an application.

The plug-in may be determined from a number of plug-ins within the multi-plug-in platform based on data and parameters relating to the desired functionality. In addition, in some cases, the plug-in may be determined based on an identified provider within the multi-plug-in platform. The provider may be identified based on the type of model element requesting the functionality. For example, if the model element is an infrastructure service template, an infrastructure template provider may be identified within the multi-plug-in platform. Then, a suitable plug-in provided by the infrastructure template provider may be identified.

At block 304, a first version of the plug-in and a second version of the plug-in are executed concurrently to provide the desired functionality. Each version of the plug-in is isolated from the other version of the plug-in, and each version of the plug-in may support a different configuration. This may enable a software developer or administrator to manage multiple versions of the plug-in simultaneously.

The first version of the plug-in and the second version of the plug-in may be executed using input from the provider of the plug-in. In some examples, in order to enable execution of the plug-in, specific runtime parameters are provided to the provider. Such runtime parameters may be specific to the desired functionality that is to be provided by the plug-in. In other examples, standard parameters may be provided to the provider in order to enable execution of the plug-in. Such standard parameters may include a service access point, a user name, a password, or the like. In addition, a provider template definition may be loaded from a registration file or a programming interface. The provider template definition may define the connection parameters that will enable execution of the plug-in supported by the provider.

In some cases, an existing version of the plug-in and a new version of the plug-in may be executed concurrently. For example, the existing version may be implemented within a first segment of a computing environment, and the new version may be implemented within a second segment of a computing environment. It may be determined whether the new version provides the desired functionality. If it is determined that the new version provides the desired functionality, the new version may be implemented within the first segment, and execution of the existing version may be ceased. On the other hand, if it is determined that the new version does not provide the desired functionality, execution of the new version may be ceased, and the existing version may be implemented within the second segment. In this manner, new versions of the plug-in may be tested before being implemented within the entire computing environment.

According to the method 300, an old version of the plug-in may be deleted if it has been verified that a new version of the plug-in is configured to replace the old version of the plug-in, or if a functionality provided by the old version of the plug-in is no longer desired. In addition, a new version of the plug-in may be reverted to an old version of the plug-in if it is determined that the new version of the plug-in does not provide the desired functionality. Further, in some cases, a state of execution of an old version of the plug-in may be maintained, and execution of a new version of the plug-in may be directed based on the state of execution of the old version of the plug-in.

It is to be understood that the process flow diagram of FIG. 3 is not intended to indicate that the steps of the method 300 are to be executed in any particular order, or that all of the steps of the method 300 are to be included in every case. Further, any number of additional steps not shown in FIG. 3 may be included within the method 300, depending on the details of the specific implementation. For example, any number of additional versions of the plug-in may also be executed concurrently to provide the desired functionality.

The method 300 may be used to provide various functionalities for any number of different applications. In some cases, the method 300 may be used for a catalog browsing application within a network environment. For example, the multi-plug-in platform 102 may identify any number of catalog providers that support plug-ins for selecting items from a catalog within a browsing window. The plug-ins may then be executed within the network environment via the multi-plug-in platform. The plug-ins may enable, for example, a user to select a number of items from the catalog within the browsing window via a user interface.

Figure 4:
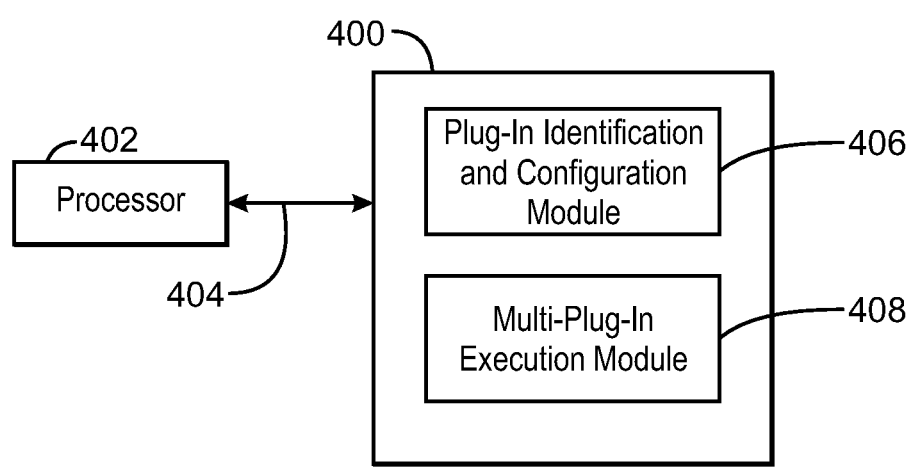
FIG. 4 is a block diagram of a tangible, non-transitory, computer-readable medium that stores a protocol adapted to implement multiple versions of a plug-in concurrently.

FIG. 4 is a block diagram of a tangible, non-transitory, computer-readable medium 400 that stores a protocol adapted to implement multiple versions of a plug-in concurrently. The tangible, non-transitory, computer-readable medium 400 may be accessed by a processor 402 over a computer bus 404. Furthermore, the tangible, non-transitory, computer-readable medium 400 may include code to direct the processor 402 to perform the steps of the current method.

The various software components discussed herein may be stored on the tangible, non-transitory, computer-readable medium 400, as indicated in FIG. 4. For example, a plug-in identification and configuration module 408 may configured to identify data relating to a plug-in that provides a desired functionality, and configure two or more versions of the plug-in to be used to provide the desired functionality. In addition, a multi-plug-in execution module 408 may be configured to execute the two or more versions of the plug-in concurrently to provide the desired functionality.

It is to be understood that FIG. 4 is not intended to indicate that all of the software components discussed above are to be included within the tangible, non-transitory, computer-readable medium 400 in every case. Further, any number of additional software components not shown in FIG. 4 may be included within the tangible, non-transitory, computer-readable medium 400, depending on the details of the specific implementation.

The present examples may be susceptible to various modifications and alternative forms and have been shown only for illustrative purposes. For example, the present techniques support both reading and writing operations to a data structure cache. Furthermore, it is to be understood that the present techniques are not intended to be limited to the particular examples disclosed herein. Indeed, the scope of the appended claims is deemed to include all alternatives, modifications, and equivalents that are apparent to persons skilled in the art to which the disclosed subject matter pertains.

What is claimed is:

1. A method for implementing multiple versions of a plug-in concurrently, comprising:
   identifying a plug-in within a multi-plug-in platform that is configured to provide a desired functionality;
   executing a first version and a second version of the plug-in concurrently to provide the desired functionality, wherein each version of the plug-in is isolated from the other version of the plug-in;
   wherein executing the first version and the second version of the plug-in concurrently comprises executing both an existing version and a new version of the plug-in, and wherein the existing version is implemented within a first segment of a computing environment and the new version is implemented within a second segment of the computing environment.

2. The method of claim 1, wherein each version of the plug-in supports a different configuration.

3. The method of claim 1, comprising executing a plurality of versions of the plug-in concurrently to provide the desired functionality, wherein each version of the plug-in is isolated from all other versions of the plug-in.

4. The method of claim 1, comprising:
   determining whether the new version provides the desired functionality;
   if it is determined that the new version provides the desired functionality, implementing the new version within the first segment of the computing environment and ceasing execution of the existing version; and
   if it is determined that the new version does not provide the desired functionality, ceasing execution of the new version and implementing the existing version within the second segment of the computing environment.

5. The method of claim 1, comprising deleting an old version of the plug-in if it has been verified that a new version of the plug-in is configured to replace the old version of the plug-in, or if a functionality provided by the old version of the plug-in is no longer desired.

6. The method of claim 1, comprising reverting from a new version of the plug-in to an old version of the plug-in if it is determined that the new version of the plug-in does not provide the desired functionality.

7. The method of claim 1, comprising:
   maintaining a state of execution of an old version of the plug-in; and
   directing execution of a new version of the plug-in to provide the desired functionality based on the state of execution of the old version of the plug-in.

8. A system with a multi-plug-in platform for implementing multiple versions of a plug-in concurrently, comprising:
   a processor; and
   a memory device that stores code that is executable by the processor, the code comprising:
   a plug-in manager configured to determine an adapter corresponding to a first version of a plug-in that is configured to provide a desired functionality;
   the adapter configured to determine a class loader corresponding to the first version of the plug-in; and
   the class loader configured to isolate the first version of the plug-in from a second version of the plug-in;
   wherein the multi-plug-in platform is configured to execute the first version of the plug-in and the second version of the plug-in concurrently to provide the desired functionality; and
   wherein executing the first version and the second version of the plug-in concurrently comprises executing both an existing version and a new version of the plug-in, wherein the existing version is implemented within a first segment of a computing environment and the new version is implemented within a second segment of the computing environment.

9. The system of claim 8, wherein the class loader is configured to isolate the first version of the plug-in from a plurality of other versions of the plug-in, and wherein the multi-plug-in platform is configured to execute the first version of the plug-in and the plurality of other versions of the plug-in concurrently to provide the desired functionality.

10. The system of claim 8, comprising identifying the plug-in and a provider of the plug-in by accessing a data store via a data access object (DAO) interface, wherein the plug-in manager is configured to determine the adapter corresponding to the first version of the plug-in based on the provider of the plug-in.

11. The system of claim 8, wherein an application within the multi-plug-in platform is configured to execute the first version of the plug-in and the second version of the plug-in concurrently to provide the desired functionality.

12. The system of claim 8, wherein the multi-plug-in platform comprises one or more data stores comprising a plurality of providers and a plurality of plug-ins for each provider.

13. The system of claim 8, comprising:
   determining whether the new version provides the desired functionality;
   if it is determined that the new version provides the desired functionality, implementing the new version within the first segment of the computing environment and ceasing execution of the existing version; and
   if it is determined that the new version does not provide the desired functionality, ceasing execution of the new version and implementing the existing version within the second segment of the computing environment.

14. The system of claim 8, wherein the multi-plug-in platform is configured to revert from a new version of the plug-in to an old version of the plug-in if it is determined that the new version of the plug-in does not provide the desired functionality.

15. A tangible, non-transitory, computer-readable medium comprising code configured to direct a processor to:
   identify a plug-in within a multi-plug-in platform that is configured to provide a desired functionality; and
   execute a plurality of versions of the plug-in concurrently to provide the desired functionality, wherein a class loader of each version is configured to isolate the version from all other versions of the plug-in;
   wherein executing the plurality of versions of the plug-in concurrently comprises executing both an existing version and a new version of the plug-in, and wherein the existing version is implemented within a first segment of a computing environment and the new version is implemented within a second segment of the computing environment.

16. The tangible, non-transitory, computer-readable medium of claim 15, wherein identifying the plug-in that is configured to provide the desired functionality comprises identifying a plug-in within the multi-plug-in platform that is configured to provide a desired data object for an application, and wherein executing the plurality of versions of the plug-in concurrently to provide the desired functionality comprises executing a first version a the second version of the plug-in concurrently to obtain the data object.

17. The tangible, non-transitory, computer-readable medium of claim 15, comprising reverting from a new version of the plug-in to an old version of the plug-in if it is determined that the new version of the plug-in does not provide the desired functionality.

18. The tangible, non-transitory, computer-readable medium of claim 15, wherein each version of the plug-in has a different configuration.

19. The tangible, non-transitory, computer-readable medium of claim 15, wherein the code is configured to direct the processor to:
   maintain a state of execution of an old version of the plug-in; and
   direct execution of a new version of the plug-in to provide the desired functionality based on the state of execution of the old version of the plug-in.

\* \* \* \* \*

UNITED STATES PATENT AND TRADEMARK OFFICE
CERTIFICATE OF CORRECTION

| | | |
|---|---|---|
| PATENT NO. | : 8,856,740 B2 | Page 1 of 1 |
| APPLICATION NO. | : 13/563532 | |
| DATED | : October 7, 2014 | |
| INVENTOR(S) | : Kevin Lee Wilson et al. | |

It is certified that error appears in the above-identified patent and that said Letters Patent is hereby corrected as shown below:

In the Claims

In column 10, line 20, in Claim 16, delete "a the" and insert -- and a --, therefor.

Signed and Sealed this
Third Day of March, 2015

Michelle K. Lee
*Deputy Director of the United States Patent and Trademark Office*